(12) United States Patent
Nishizawa et al.

(10) Patent No.: US 6,858,283 B2
(45) Date of Patent: Feb. 22, 2005

(54) LABELS FOR IN-MOLD FORMING AND MOLDED RESIN PRODUCTS HAVING THE SAME

(75) Inventors: Takatoshi Nishizawa, Ibaraki (JP); Masaki Shiina, Ibarakai (JP); Akihiko Ohno, Tokyo (JP)

(73) Assignee: Yupo Corporation, Tokyo (JP)

( * ) Notice: Subject to any disclaimer, the term of this patent is extended or adjusted under 35 U.S.C. 154(b) by 144 days.

(21) Appl. No.: 10/319,625

(22) Filed: Dec. 16, 2002

(65) Prior Publication Data

US 2003/0151247 A1 Aug. 14, 2003

Related U.S. Application Data

(63) Continuation of application No. PCT/JP01/05105, filed on Jun. 15, 2001.

(30) Foreign Application Priority Data

Jun. 16, 2000 (JP) ........................................ 2000-181257
Jul. 27, 2000 (JP) ........................................ 2000-226451

(51) Int. Cl.⁷ ................................................. B32B 3/24
(52) U.S. Cl. ..................... 428/137; 428/35.7; 428/141; 428/343; 428/195.1; 428/229; 264/509; 156/87; 283/81
(58) Field of Search ................................ 428/35.7, 137, 428/141, 343, 195.1, 220; 264/509; 156/87; 283/81

(56) References Cited

U.S. PATENT DOCUMENTS

| | | | | |
|---|---|---|---|---|
| 3,108,850 A | * | 10/1963 | Brandy | ........................ 264/509 |
| 4,986,866 A | * | 1/1991 | Ohba et al. | .................. 156/220 |
| 5,223,315 A | | 6/1993 | Katsura et al. | |
| 5,254,302 A | * | 10/1993 | Yamanaka | ................... 264/129 |
| 5,804,127 A | * | 9/1998 | Takatori et al. | ............. 264/515 |
| 5,811,163 A | | 9/1998 | Ohno et al. | |
| 5,916,646 A | * | 6/1999 | Baudin | ...................... 428/36.1 |
| 6,551,685 B1 | * | 4/2003 | Wojewoda et al. | ......... 428/132 |

FOREIGN PATENT DOCUMENTS

| | | |
|---|---|---|
| JP | 6-328547 | 11/1994 |
| JP | 2000-47588 | 2/2000 |

* cited by examiner

*Primary Examiner*—William P. Watkins, III
(74) *Attorney, Agent, or Firm*—Oblon, Spivak, McClelland, Maier & Neustadt, P.C.

(57) ABSTRACT

Disclosed is a label for in-mold forming comprising a thermoplastic resin film base layer and a heat-seal resin layer, wherein a surface of the heat-seal resin layer has a centerline average roughness of 0.5 to 5 micrometers and the label has an air permeability of 10 to 20,000 seconds. When in-mold forming is conducted with the label of the present invention, labeled molded resin articles of various shapes can be manufactured while effectively inhibiting blistering.

24 Claims, 6 Drawing Sheets

(a)  (b)

LABELS FOR IN-MOLD FORMING AND MOLDED RESIN PRODUCTS HAVING THE SAME

CROSS REFERENCE TO RELATED APPLICATION

This is a Continuation Application of PCT Application No. PCT/JP01/05105, filed on Jun. 15, 2001, which was not published under PCT Article 21(2) in English.

This application is based upon and claims the benefit of priority from the prior Japanese Patent Application Nos. 2000-181257, filed on Jun. 16, 2000 and 2000-226451, filed on Jul. 27, 2000, the entire contents of which are incorporated herein by reference.

BACKGROUND OF THE INVENTION

1. Field of the Invention

The present invention relates to labels used in in-mold forming. The present invention further relates to molded resin products to which such labels are applied.

2. Discussion of the Background

In-mold forming is a known method of manufacturing labeled molded resin products by integrated molding. In this method, a label is placed in advance on the inner wall of a mold, a moldable resin such as polyethylene or propylene based resin is melted and directly fed into the mold, and the label is attached by injection, vacuum, differential pressure, or foam molding (see Japanese Unexamined Patent Publication (KOKAI) Showa No. 58-69015 and European Patent Publication No. 254923). Known forms of such labels used in in-mold forming are gravure printed resin films, polychromatic offset printed synthetic paper (for example, see Japanese Examined Patent Publication (KOKOKU) Heisei No. 2-7814 and Japanese Unexamined Patent Publication (KOKAI) Heisei No. 2-84319), and aluminum labels comprising aluminum foil on the rear side of which is laminated a high-pressure low-density polyethylene or an ethylene-vinyl acetate copolymer and on the front side of which gravure printing is conducted.

However, in the manufacturing of labeled containers by hollow molding using these conventional in-mold forming labels, when the portion of the container to which the labels are attached is highly curved or undulated, there is a problem during expansion of the parison being extruded from the die by the injection of air in that air present between the label secured in the mold and the parison forms air pockets known as "blisters." Since labeled containers having blisters are of little commercial value, there is a need to prevent blister formation.

In response to such problems, Japanese Examined Patent Publication (KOKOKU) Heisei No. 6-70736 and Japanese Examined Utility Model Publication (JIKKO) Heisei No. 7-54109 propose that special through-holes be provided in the label to suppress blistering.

However, when the shape of the container involved is cylindrical (meaning containers designed to have true circular cross-sections when viewed from the top or bottom, including the case where there is some deviation from a true circular form due to dimensional error in the mold, contraction of resin in the mold, or the like), as shown in the sectional view of FIG. 1, when label (1) occupies a large amount of the area along the perimeter of container (2), preventing blistering necessitates either providing large-diameter through-holes or increasing the number of through-holes per unit area to facilitate the escape of air. However, when large-diameter holes are made, labeled containers of poor appearance due to conspicuous through-holes are obtained. When the number of through-holes per unit area is increased, due to the presence of numerous through-holes in the label in the area of the suction pad (normally about 10 to 30 mm in diameter) of the automatic label feeder, problems are encountered in the course of picking up stacked labels in that the labels cannot be picked up by suction, the labels fall off along the way, or two labels are picked up at once. There are also problems in that, depending on the size and positioning of suction holes in the mold in which the label is secured, the label cannot be secured in the proper position.

To minimize these problems, it is necessary to form suitable through-holes in the label by trial and error in combining the shape of the container and label, the size and positioning of the suction pads, and the size and positioning of the suction holes in the mold. Thus, for conventional labels, it has not been possible to widely employ various container and label shapes, or the broad use thereof has not been possible with feeding units and molds.

Japanese Examined Patent Publication (KOKOKU) Heisei No. 4-71699 proposes the prevention of blistering by the use of a film having minute ventilation holes. However, when ventilation is increased excessively to prevent blistering, the above-described problems with label feeding with an automatic label feeder tend to occur. Thus, this label is also precluded from use in various shapes on a variety of differently shaped containers, or is precluded from wide use in feeders and molds.

In light of the above-described problems of prior art, the object of the present invention is to provide a label for in-mold forming permitting the attachment of labels while effectively inhibiting blistering on molded resin articles having a variety of shapes. A further object of the present invention is to provide a label for in-mold forming permitting smooth suction by automatic label feeding devices and reliable securing of labels, thereby affording high manufacturing efficiency with in-mold labels. A still further object of the present invention is to provide a labeled molded resin article that is attractive in appearance and can be manufactured economically.

SUMMARY OF THE INVENTION

The present inventors conducted extensive research, resulting in the discovery that by imparting a prescribed degree of air permeability to labels and adjusting the centerline average roughness of the surface of the heat seal resin layer to within a prescribed range, it was possible to effectively prevent blistering in a manner permitting the reliable and smooth feeding of labels to various automatic label feeders and molds; the present invention was devised on that basis.

That is, the present invention provides a label for in-mold forming comprising a thermoplastic resin film base layer and a heat-seal resin layer, wherein a surface of the heat-seal resin layer has a centerline average roughness of 0.5 to 5 micrometers and the label has an air permeability of 10 to 20,000 seconds.

In the label for in-mold forming of the present invention, the value obtained by dividing the air permeability by the centerline average roughness is desirably from 10 to 4,000 seconds/micrometer. Further, the outer surface of the heat seal resin layer is desirably embossed. In the label for in-mold forming of the present invention, holes and/or slits are desirably present in the form of a grid-like pattern. When slits are present, the length of the slits is desirably from 0.5 to 20 mm and the pitch is desirably from 5 to 25 mm. Further, the thermoplastic resin film base layer comprising the label for in-mold forming of the present invention is desirably comprised of a film that has been stretched in at least one direction. Further, the thermoplastic resin film base layer is desirably comprised of a microporous stretched resin film comprising organic and/or inorganic finepowder. The heat seal resin layer is desirably comprised of polyethylene with a degree of crystallinity of 10 to 60 percent, a number average molecular weight of 10,000 to 40,000, and a melting point of 50 to 130° C.

The present invention further provides a labeled molded resin article in which the label for in-mold forming is integrally adhered to a molded resin article by thermal fusion. A preferable resin article is prepared by vacuum molding or differential pressure molding. The portion of the molded resin article where the label for in-mold forming has been thermally fused desirably comprises a curved surface, particularly a curved surface with a radius of curvature of 200 mm or less.

DETAILED DESCRIPTION OF PREFERRED EMBODIMENTS

The label for in-mold forming and labeled molded resin article of the present invention are described in detail below.

Figure 1:
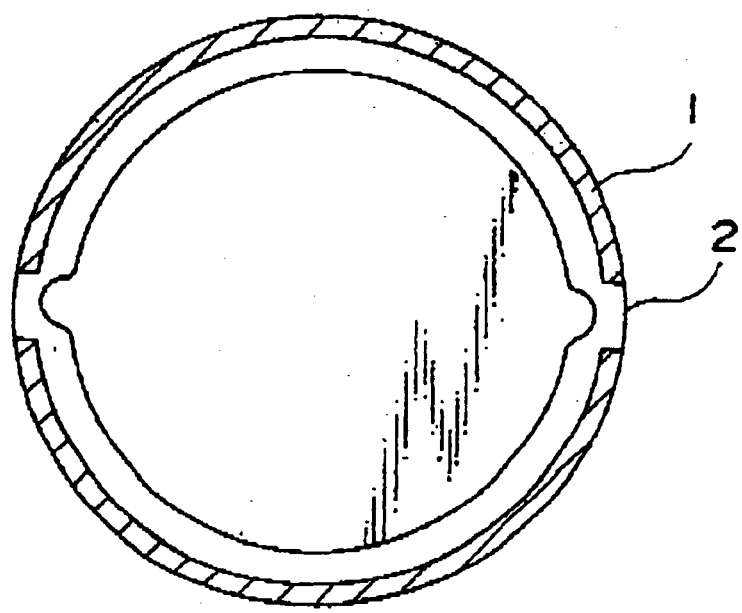
FIG. 1 is a sectional view showing a cylindrical container having an adhered label.
Figure 2:
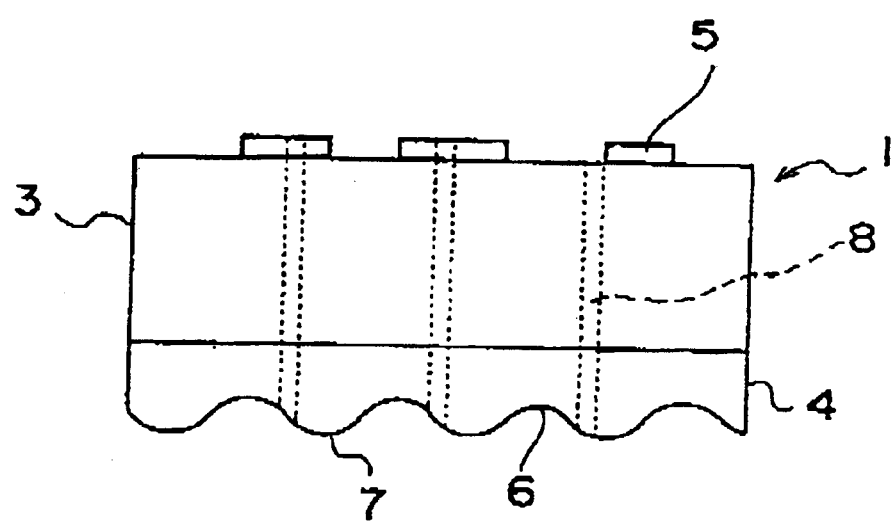
FIG. 2 is a sectional view of a form of the label for in-mold forming of the present invention.

FIG. 2 is a sectional view of a typical form of the label for in-mold forming of the present invention. Label for in-mold forming (1) of the present invention comprises a thermoplastic resin film base layer (3) and a heat-seal resin layer (4). The surface of thermoplastic resin film base layer (3) may be printed (5) as shown in the figure. The centerline average roughness of the surface of heat-seal resin layer (4) is adjusted to from 0.5 to 5 micrometers. The centerline average roughness can be adjusted, for example, by embossing the surface of heat-seal resin layer (4) to form embossed valleys (6) and peaks (7). The air permeability of the label for in-mold forming of the present invention is adjusted to from 10 to 20,000 seconds. The air permeability is adjusted, for example, by forming through-holes or slits (cut lines) (8) through the label as shown in the figure.

The thermoplastic resin film base layer constituting the label for in-mold forming of the present invention is a film-like layer comprised of thermoplastic resin and is the layer functioning as the base material of the label for in-mold forming of the present invention. Examples of materials employed in the thermoplastic resin film layer are films of: polypropylene, propylene-ethylene copolymer, high-density polyethylene, medium-density polyethylene, polymethyl-1-pentene, ethylene-cyclic olefin copolymers, other polyolefin resins, polyethylene terephthalate resins, polyvinyl chloride resins, nylon 6, nylon 6,6, nylon 6,10, nylon 6,12, other polyamide resins, ABS resins, and ionomer resins. Of these, the preferred materials are polypropylene, high-density polyethylene, polyethylene terephthalate, and other thermoplastic resins with melting points ranging from 130 to 280° C. These resins may be employed singly or in combinations of two or more.

The chief component thermoplastic resin desirably has a melting point that is 15° C. or more higher than the melting point of the polyolefin resin constituting the heat seal resin layer. Among resins satisfying this condition, propylene based resin is desirable from the perspectives of resistance to chemicals and cost. Examples of such propylene based resins are isotactic or syndiotactic stereoregular propylene homopolymers; and copolymers of the chief component propylene with alpha-olefins such as ethylene, 1-butene, 1-hexene, 1-heptene, 4-methyl-1-pentene, and the like. These copolymers may be in the form of two-element systems, three-element systems, four-element systems, random copolymers, and block copolymers.

In addition to the thermoplastic resin, inorganic finepowders, organic finepowders, and the like may be suitably blended into the thermoplastic resin film base layer.

The type of inorganic finepowder or organic finepowder is not specifically limited.

Examples of inorganic finepowders are heavy calcium carbonate, precipitated calcium carbonate, baked clay, talc, barium sulfate, diatomaceous earth, magnesium oxide, zinc oxide, titanium dioxide, and silicon oxide. Of these, heavy calcium carbonate, baked clay, and talc are preferred from the viewpoints of cost and easiness of forming.

Examples of organic finepowders are polyethylene terephthalate, polybutylene terephthalate, polyamide, polycarbonate, polyethylene napththalate, polystyrene, melamine resins, polyethylene sulfide, polyimide, polyethyl ether ketone, and polyphenylene sulfide. Among these, the use of immiscible finepowder(s) with a higher melting point than the thermoplastic resin employed is desirable.

One of the above-listed finepowders may be selected and employed singly in the thermoplastic resin film base layer, or two or more may be selected and employed in combination. When employing two or more in combination, organic finepowder(s) and inorganic finepowder(s) may be employed in combination.

A film comprising 8 to 80 weight percent of the above-described organic or inorganic finepowder in a thermoplastic resin, a film stretched by a known method in one or two directions, a film the surface of which is coated with a latex comprising an inorganic filler, and a film on which aluminum has been vapor deposited or applied may be suitably employed as the thermoplastic resin film base layer.

Figure 3:
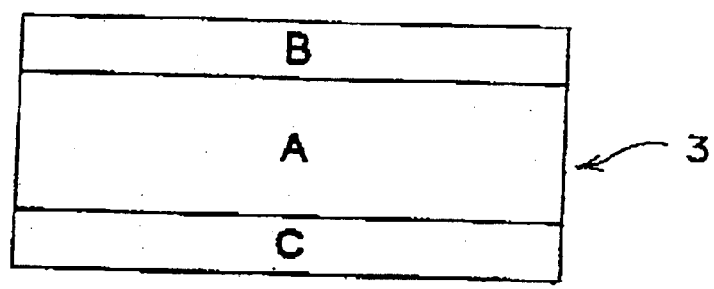
FIG. 3 is a sectional view of an example of a desirable configuration of the thermoplastic resin film base layer of the label for in-mold forming of the present invention.

From the viewpoints of printing properties, preventing heat shrinkage, and the like, it is desirable to employ a thermoplastic resin film base layer in the form of a microporous stretched resin film having a biaxially-stretched film core layer (A) comprising 5 to 30 weight percent of inorganic finepowder, 3–20 weight percent of high-density polyethylene, and 92 to 50 weight percent of propylene based resin, on one side of which is present a surface layer (B) in the form of a monoaxially-stretched film with a resin composition of 35 to 65 weight percent of inorganic finepowder, 0 to 10 weight percent of high-density polyethylene, and 55–35 weight percent of propylene based resin, and on the other side of which is present a back layer (C) in the form of a monoaxially-stretched film with a resin composition of 35–65 weight percent of inorganic finepowder, 0–10 weight percent of high-density polyethylene, and 55–35 weight percent of propylene based resin (FIG. 3).

The same or different inorganic finepowders may be employed in core layer (A), surface layer (B), and back layer (C). The same or different high-density polyethylenes may be employed in core layer (A), surface layer (B), and back layer (C). For specific combinations of materials, refer to the examples described below.

As required, dispersing agents, oxidation inhibitors, compatibility enhancers, ultraviolet radiation stabilizers, antiblocking agents, and the like may be incorporated into the thermoplastic resin film base layer.

The film constituting the thermoplastic resin film base layer is desirably stretched in at least one direction. When the thermoplastic resin film base layer is comprised of multiple layers, each of the layers may be stretched prior to lamination or stretched after lamination. It is also possible to laminate stretched layers and them restretch them. Still further, it is possible to form a heat seal resin layer on the thermoplastic resin film base layer and then stretch the entire laminate.

Known methods of stretching may be employed. The stretching temperature may be set to greater than or equal to the glass transition temperature of the thermoplastic resin when employing an amorphous resin, and greater than or equal to the glass transition temperature of the amorphous portion and less than or equal to the melting temperature of the crystalline portion when employing a crystalline resin.

The specific method of stretching is not limited. However, stretching between rollers exploiting differences in the perimeter speeds of a group of rollers is desirable. This method permits adjustment of the stretching factor to any level desired. Further, since the direction in which the resin is stretched is aligned with the direction of film flow, a label is obtained that has higher tensile strength and less dimensional change due to tension during printing than unstretched film.

The printing properties of the surface of the film constituting the thermoplastic resin film base layer can be improved by corona discharge treatment, flame plasma treatment, and the like.

The thickness of the thermoplastic resin film base layer is desirably from 20 to 250 micrometers, preferably from 30 to 200 micrometers. At a thickness of less than 20 micrometers, the labels are not fed into the mold by the automatic label feeder at a fixed regular position, and the labels tend to crease. By contrast, when 250 micrometers is exceeded, the strength of the boundary portion between the label and the molded resin article formed in-mold decreases and the drop strength of the molded resin article tends to deteriorate.

The heat-seal resin layer constituting the label of the present invention has the function of adhering to the resin material with the application of heat applied in the course of in-mold forming.

The resin constituting the heat-seal resin layer is not specifically limited beyond that it have such a heat sealing property. Preferred resins are ethylene based resins with melting points of 50 to 130° C., preferably 55 to 125° C., such as high-pressure polyethylene having a low to medium density of 0.900 to 0.935 g/cm$^3$, linear low density polyethylene with a density of 0.880 to 0.940 g/cm$^3$, ethylene-vinyl acetate copolymer, ethylene-acrylic acid copolymer, ethylene-alkyl acrylic ester copolymer, ethylene-alkyl methacrylic ester copolymer (the alkyl group having from 1 to 8 carbon atoms), and metallic salts (Zn, Al, Li, K, Na, and the like) of ethylene-methacrylic acid copolymers.

Of these, high-pressure polyethylene and linear low density polyethylene which have a crystallinity (as measured by X-ray) of 10 to 60 percent and a number average molecular weight of 10,000–40,000 are preferred. Among these, from the viewpoint of adhesion to molded resin articles, a linear low density polyethylene obtained by copolymerizing 40 to 98 weight percent of ethylene and 60 to 2 weight percent of an alpha-olefin comprising 3 to 30 carbon atoms with a metallocene catalyst (particularly a metallocene-almoxane catalyst, or, for example, a catalyst comprised of a metallocene compound such as that disclosed in International Patent Publication No. WO92/01723 and a compound forming stable anions when reacted with a metallocene compound) is optimal. These polyolefin resins may be employed singly or on combinations of two or more.

The heat-seal resin layer can be formed on the thermoplastic resin film base layer by, for example, melting and film-laminating (melt laminating method) or coating for lamination (coating method). According to the melt laminating method, the heat-seal resin layer can be formed by coating the emulsion of a heat-seal resin described above or a resin solution prepared by dissolving a heat-seal resin in a solvent such as toluene and ethyl cellosolve on the thermoplastic resin film base layer and then drying the resultant.

To the extent that the required properties of the heat-seal resin layer are not compromised, other known resin additives may be added to the heat-seal resin layer. Examples of such additives are dyes, nucleators, plasticizers, mold releasing agents, oxidation inhibitors, antiblocking agents, flame retardants, UV-absorbing agents, and the like.

The thickness of the heat seal resin layer is desirably from 1 to 10 micrometers and preferably from 2 to 8 micrometers. During hollow forming, it is necessary for the heat-seal resin layer to be melted by the heat of the melted polypropylene and polyethylene parison and for the molded resin article and label to firmly fuse. To that end, it is desirable for the thickness of the heat-seal resin layer to be greater than or equal to 1 micrometer. Further, when 10 micrometers are exceeded, the label tends to curl, offset printing tends to become difficult, and securing the label in the mold tends to become problematic.

The label for in-mold forming of the present invention is comprised of a thermoplastic resin film base layer and a heat-seal resin layer. The centerline average roughness of the surface of the heat-seal resin layer (based on JIS-B-0601) is from 0.5 to 5 micrometers, and the air permeability of the label (based on JIS-P-8117) is from 10 to 20,000 seconds. Adjusting the centerline average roughness and air permeability to within prescribed ranges in this manner permits the feeding of labels into the mold by the automatic feeder without errors, improves the escape of air during hollow forming, and effectively prevents blistering.

The centerline average roughness of the surface of the heat-seal resin layer of the present invention is from 0.5 to 5 micrometers, preferably from 1 to 4 micrometers. When the centerline average roughness is less than 0.5 micrometer, there is inadequate escape of air during hollow forming and undesirable blistering tends to develop. A roughness exceeding 5 micrometers is undesirable in that it becomes difficult for the suction pads of the automatic label feeder to pick up labels from the label magazine and feed them to the mold, the labels tend to drop off along the way, and the labels tend not to adequately adhere to the molded resin product.

The air permeability of the label of the present invention is from 10 to 20,000 seconds, preferably from 30 to 15,000 seconds. An air permeability of less than 10 seconds is undesirable in that as the suction pads of the automatic label feeder pick up labels from the label magazine and insert them into the mold, two or more labels tend to be picked up simultaneously, and labels tend to drop off during transport and from the wall of the mold in which suction holes are provided. Air permeability exceeding 20,000 seconds is undesirable in that even when an embossing treatment such as that set forth further below is conducted, the escape of air during hollow forming is inadequate, resulting in a tendency to blister.

Restricting the centerline average roughness and air permeability to within the ranges of the present invention is important to present blistering in a broad range of shapes of molded resin articles and labels. The centerline average roughness and air permeability may be set to any value within the above-stated ranges. However, the smaller the value of air permeability (the greater the permeability), the lighter the embossing becomes. Conversely, the greater the air permeability value (the smaller the permeability), the heavier the embossing becomes, which is desirable. The value obtained by dividing the air permeability (the number of galley seconds) by the centerline average roughness (micrometers) is desirably set to from 10 to 4,000 seconds/micrometer and preferably set to from 20 to 3,000 seconds/micrometer, permitting the obtaining of labeled molded resin articles in which the generation of blistering has been more effectively prevented, even for a variety of shapes of molded resin articles and labels.

The surface of the heat-seal resin layer is desirably embossed to adjust the ratio of the centerline average roughness and air permeability to within the range of the present invention. Types of embossing include diagonal, pyramidal, trapezoidal, and the reverse of the same. Of these, a roll engraved with a reverse trapezoidal embossing pattern is desirably applied with pressure at a temperature from near the melting point to greater than the melting point of the heat-seal resin to transfer the embossing pattern. The embossing pattern desirably has from 80 to 200 lines (pattern) per inch.

Holes and/or slits are desirably formed in the label of the present invention to adjust the label air permeability to within the range of the present invention.

When forming holes in the label of the present invention, the hole diameter is desirably from 0.05 to 1 mm, preferably from 0.1 to 0.5 mm. The pitch of adjacent through-holes is desirably from 5 to 30 mm. The method of piercing the holes is not specifically limited. However, holes are desirably formed by means of a needle, electron beam, laser beam, or the like from either the printed surface or heat-seal surface side. In this process, it is necessary to adjust the hole diameter and pitch to adjust the air permeability to within the stated range. That is, when the hole diameter is small, a narrow pitch is necessary, and conversely, when the hole diameter is large, a wide pitch is necessary. However, the above-stated range is difficult to achieve with a hole diameter of less than 0.05 mm, and when 1 mm is exceeded, labeled molded resin products with conspicuous through-holes tend to be obtained. The pitch of adjacent through-holes is desirably greater than 7 mm and less than or equal to 30 mm, preferably 8–25 mm, and more preferably 10–20 mm. When the pitch is 7 mm or less, permeability becomes excessive and it becomes difficult to impart an air permeability within the above-stated range. Further, when the diameter of the suction pads on an automatic label feeder is 30 mm, for example, there are roughly 28 through-holes contained in an area of corresponding size and, as set forth above, it becomes difficult to supply labels to the mold. Conversely, when the pitch exceeds 30 mm, although there is no problem with the feeding of labels to the mold due to permeability, it becomes difficult to impart air permeability falling within the above-stated range and blistering tends to develop due to inadequate escape of air. When forming holes with a needle, in addition to a conical needle, it is also possible to employ a triangular cone, square cone, polygonal cone with even more sides, and various other needles.

Figure 4:
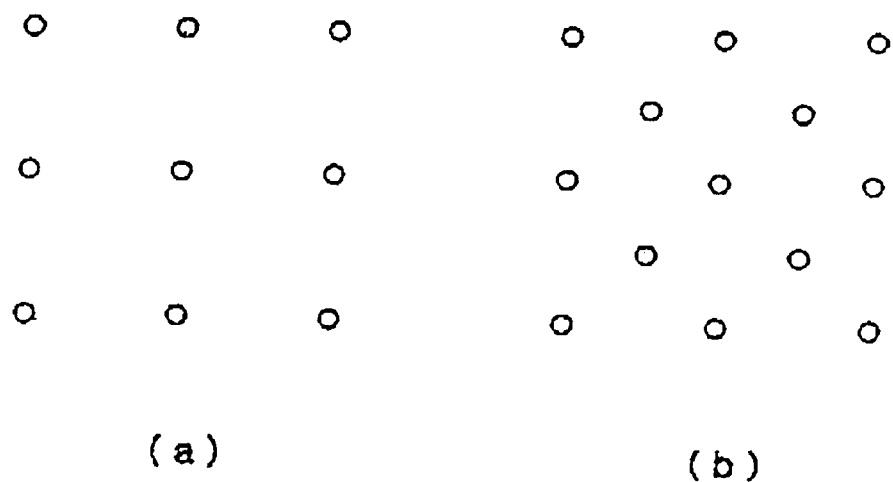
FIG. 4 shows patterns of through-holes.

The pattern of through-holes is not specifically limited other than that the air permeability of the label be adjusted to from 10 to 20,000 seconds. For example, patterns in the form of the grid-like shape such as that shown in FIG. 4(a) and the diagonal grid-like shape such as that shown in FIG. 4(b) may be employed, along with various other patterns. In consideration of cost, the use of a simple pattern is desirable.

When forming slits in the label of the present invention to adjust the degree of air permeability, the length of the slits is desirably from 0.5 to 20 mm, preferably from 1 to 15 mm. Slits that are less than 0.5 mm or exceed 20 mm in length tend to make it difficult to adjust the air permeability to within the range of the present invention. In particular, slits exceeding 20 mm tend to open and yield a labeled molded resin article of poor external appearance. To adjust the air permeability to within the range of the present invention, the distance (pitch) between the centers of adjacent slits is desirably from 5 to 25 mm, preferably from 10 to 20 mm. When the pitch is less than 5 mm, permeability is excessively good and it becomes difficult to adjust air permeability to within the range of the present invention. For example, when the suction pad of the automatic label feeder is 30 mm in diameter, it becomes difficult to feed labels into the mold, as described above. By contrast, when the pitch exceeds 25 mm, although there is no problem with feeding the labels into the mold due to permeability, it becomes difficult to adjust air permeability to within the range of the present invention and there is inadequate air escape, tending to cause blistering. The relation between the length of the slits formed in the labels and pitch is not specifically limited. However, in general, the shorter the slits, the tighter the pitch, and the longer the slits, the looser the pitch must be made.

The length and pitch of multiple slits formed in the label may be identical or may vary. To cut manufacturing costs by simplifying the label manufacturing process, the length and pitch of all of the slits formed in the label are desirably made identical.

Figure 5:
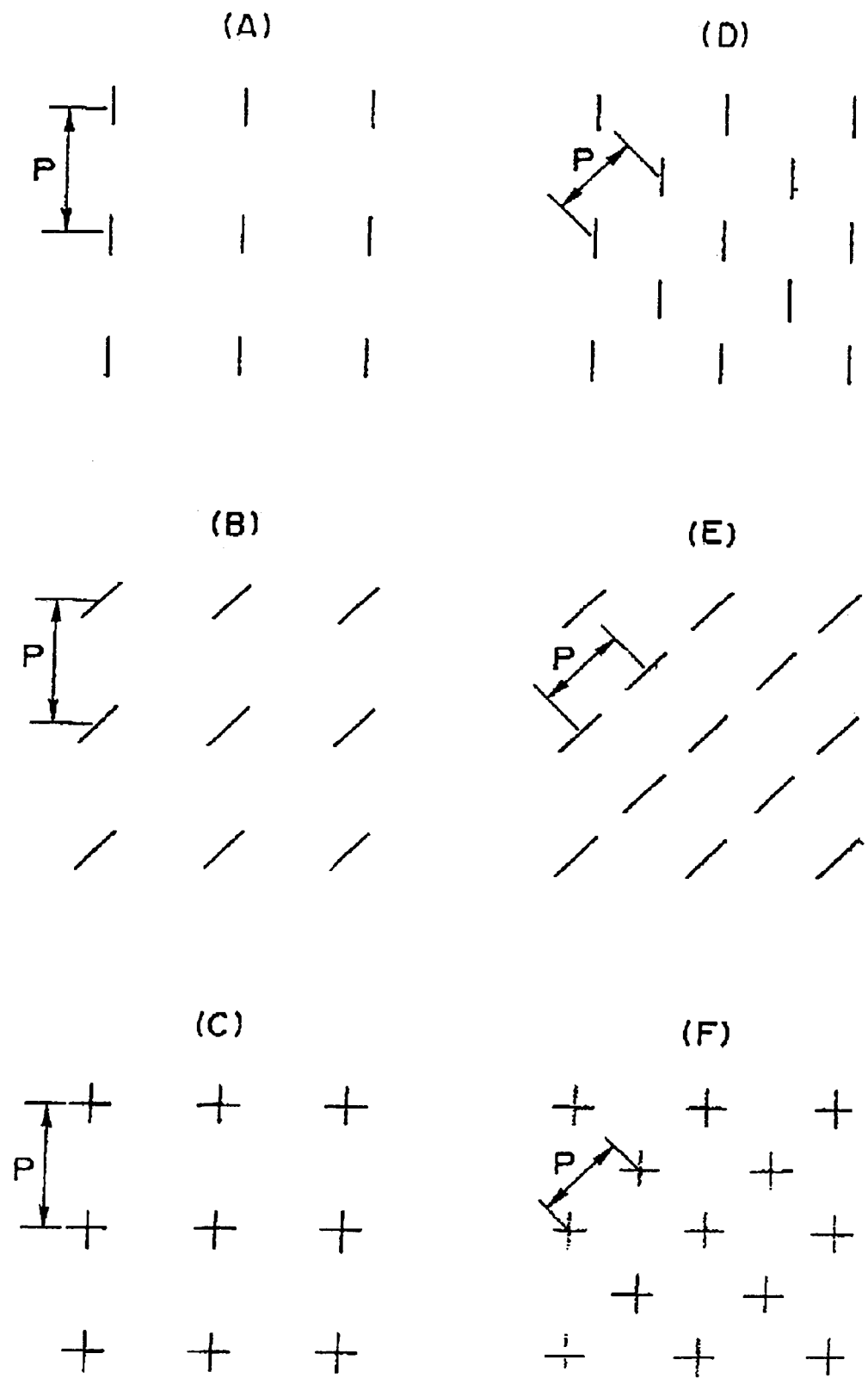
FIG. 5 shows patterns of slits.

The pattern of slits formed in the label of the present invention is not specifically limited. However, a grid-like pattern is desirable. Specific examples of grid-like patterns are given in FIG. 5. FIGS. 5(A), (B), and (C) show patterns in which slits are arranged in the form of grids, and FIGS. 5(D), (E), and (F) show patterns in which slits are arranged in the form of diagonal grids. The orientation of the slits making up each pattern may be vertical, as shown in FIGS. 5(A) and (D), or horizontal (not shown). It may also be diagonal, as shown in FIGS. 5(B) and (E). Further, the slits may be in the form of crosses, as shown in FIGS. (C) and (F). There may be one single pattern over the entire label, or a number of patterns may be present.

When the slit pattern is that of a grid or diagonal grid, it is desirable to make the slits short and impart a pitch that does not allow the slits to connect. Specifically, it is desirable for the length of the slits to be less than or equal to $2/3$ the pitch, preferably less than or equal to ½ the pitch. When ⅔ is exceeded, the rigidity and strength of the labels drops precipitously, and the labels tend to become difficult to handle and feed into the mold.

Figure 6:
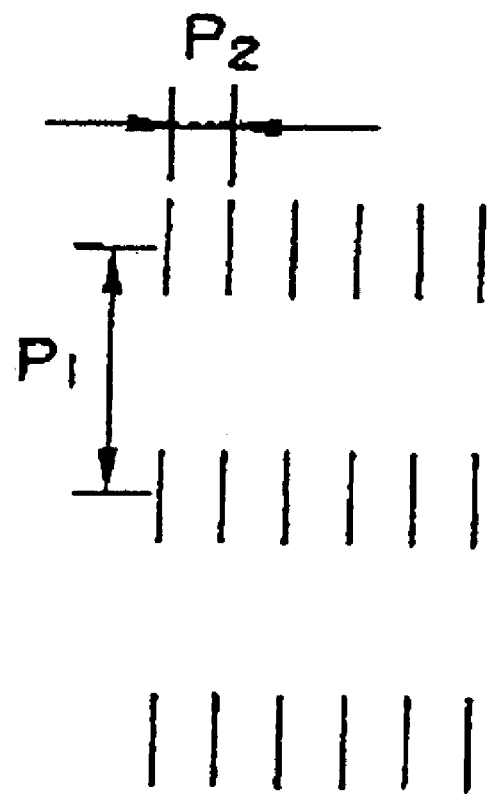
FIG. 6 shows a further pattern of slits.

Slit patterns other than those described above may also be employed in the label of the present invention. For example, the pattern shown in FIG. 6 with a vertical pitch (p1) and a horizontal pitch (p2) that are different may also be employed. When using such a pattern, the larger pitch (p1 in FIG. 6) is desirably 5 to 25 mm, preferably 10 to 20 mm. Further, it is desirable for the length of the slits to be less than or equal to ⅔ the larger pitch, preferably less than or equal to ½ the larger pitch, so that the slits do not connect.

Since it is not essential that multiple patterns and slit configurations be employed in the label of the present invention, it is desirable to employ simple patterns such as those given in the examples of FIGS. 5(A), (B), (D), and (E).

The method of forming slits in the label of the present invention is not specifically limited. However, the use of a known means such as a Thomson blade, die roll, or laser beam from either the print or heat seal side of the label is desirable.

The above-described holes or slits can be formed from either the print side or heat-seal side. However, the holes or slits are desirably formed from the print side because an attractive external appearance is more readily achieved in this manner. Although the shape of the holes or slits is not specifically limited so long as it satisfies the air permeability range of the present invention, slits are desirably simple, straight, and unobtrusive.

Further, the holes or slits may be formed either before or after printing. However, when the holes or slits are formed before printing, depending on the print pattern, no ink is picked up in the hole or slit portions, leaving blanks that detract from the external appearance. Further, based on the type and quantity of ink or varnish, the holes or slits may close up, making it impossible to achieve the range of air permeability required by the present invention. Thus, it is desirable to form the holes or slits after printing. The labels may be cut to desired size by punching.

The labels for in-mold forming of the present invention may be printed. Printing can be conducted on the thermoplastic resin film surface on which no heat-seal resin layer is formed. Examples include gravure printing, offset printing, letterpress printing, flexo printing, and screen printing. Specifically, a product name, characters, bar codes, manufacturer, distributor, method of use, cautions, or the like can be printed. Still further, an overcoat layer can be formed on the surface, or vapor deposition of a metal such as aluminum or hot stamping may be conducted.

The label of the present invention can be adhered to a molded resin article by in-mold forming. The in-mold forming method is not specifically limited; any of the commonly employed methods are suitable.

Figure 7:
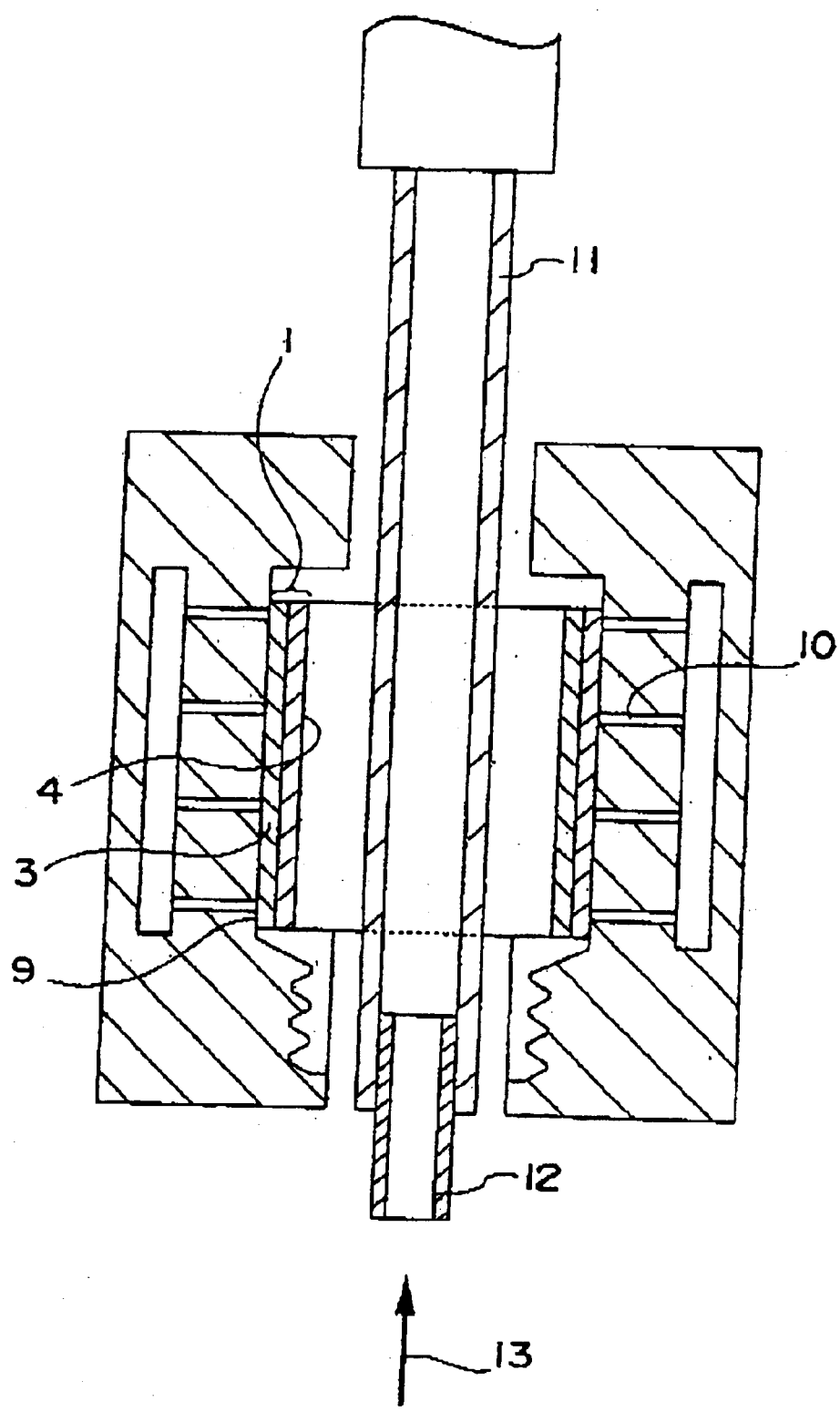
FIG. 7 is a sectional view descriptive of the method of in-mold forming.

For example, as shown in FIG. 7, the thermoplastic resin film base layer (3) side of the label for in-mold forming (1) of the present invention is positioned in contact with the inner wall of a cavity (9) in a mold. Suction from suction holes (10) secures label for in-mold forming (1) to the inner wall of cavity (9), after which melt parison (11) of the thermoplastic resin serving as the resin material is guided into the mold. The mold is then closed and compressed air (13) is directed into parison (11) through blow nozzle (12). Parison (11) inflates, assuming the shape of the mold wall, including that of cavity inner wall (9), and label for in-mold forming (1) secured to cavity inner wall (9) is pressed from the heat-seal resin layer (4) side, causing label for in-mold forming (1) to be hot-fused to the wall of the formed resin article, yielding a hollow labeled molded resin product.

Since the label for in-mold forming of the present invention has a prescribed air permeability and centerline average roughness, the label is secured at the correct position within the mold without falling out or shifting position during in-mold forming. Further, since the air between the parison and the label is smoothly extracted during hollow forming, blistering is effectively prevented. Thus, the use of the in-mold forming label of the present invention permits the reliable and efficient manufacturing of labeled molded resin articles of good external appearance.

Further, the label for in-mold forming of the present invention can be adhered to surfaces having a variety of shapes. The label for in-mold forming of the present invention can be effectively adhered to curved surfaces in particular. The label for in-mold forming of the present invention can be efficiently inhibit blistering and adhered better than conventional labels to curved surfaces of large curvature, such as a radius of curvature of less than or equal to 200 mm, preferably less than or equal to 100 mm, and more preferably less than or equal to 50 mm.

The larger the curvature, the poorer the escape of air during in-mold forming. In conventional labels, there is a strong tendency to blister. Thus, conventionally, setting of the size and position of the through-holes is done by trial and error based on various molded resin article and label shapes, the size and positioning of the suction pads of the automatic label feeder, and the size and positioning of the suction holes in the mold. Such trial and error is not necessary with the present invention. It is possible to effectively adhere labels by in-mold forming to small-diameter cylindrical and flattened containers. Thus, manufacturing costs and time can be greatly reduced and numerous production advantages are afforded.

The type of resin material employed in in-mold forming is not specifically limited. Desirable examples are thermoplastic resins such as polypropylene, polyethylene, polyvinyl chloride, polyethylene terephthalate, polyamide and the like. The type of thermoplastic resin can be suitably selected based on the intended use of the molded article following in-mold forming, the use environment, and the mode of use. Thus, for example, a gas barrier material such as Evar or the like can be used to impart a gas barrier.

Thus, using the label of the present invention in in-mold forming, it is possible to readily manufacture labeled molded resin products. The molded resin article may be put to a variety of uses, including use as containers. The use of these articles is not limited to that of containers; for example, the molded article can be cut into sections and fused with other materials for uses other than as containers. In the present Specification, the term "labeled molded resin article" covers all molded resin articles to which labels are attached, without limitation of use.

EXAMPLES

The present invention is described more specifically below through examples, comparative examples, and test examples. The materials, quantities employed, proportions, methods of treatment, and treatment procedures given below can be suitably modified without departing from the essence of the present invention. Accordingly, the scope of the present invention is not limited to the specific examples given below.

In the examples and comparative examples given below, the melt flow rate (MFR) was measured in accordance with JIS-K-7210, the density in accordance with JIS-K-7112, the air permeability in accordance with JIS-P-8117, the centerline average roughness in accordance with JIS-B-0601, and the smoothness in accordance with JIS-P-8119.

Examples 1 to 4 and Comparative Examples 1 to 6

The labels for in-mold forming of Examples 1 to 4 and Comparative Examples 1 to 6 were manufactured by the procedures described below under the conditions given in Table 1.

A resin composition (A) comprising 67 weight parts of propylene homopolymer (product name Novatec PP, MA-8, melting point 164° C., made by Japan Polychem Corp.), 10 weight parts of high-density polyethylene (product name Novatec HD, HJ580, melting point 134° C., density 0.960 g/cm$^3$, made by Japan Polychem Corp.), and 23 weight parts of calcium carbonate powder with a particle diameter of 1.5 micrometers was melted and kneaded in an extruder, extruded at 250° C. in sheet form from a die, and cooled to about 50° C. Next, the sheet was heated to about 153° C. and stretched by four times in a machine direction using the peripheral speed of a group of rollers, yielding monoaxially stretched film.

Separately, a resin composition (B) comprising 51.5 weight parts of propylene homopolymer (product name Novatec PP, MA-3, melting point 165° C., made by Japan Polychem Corp.), 3.5 weight parts of high-density polyethylene (product name Novatec HD, HJ580, density 0.950 g/cm$^3$, made by Japan Polychem Corp.), 42 weight parts of calcium carbonate powder with a particle diameter of 1.5 micrometers, and 3 weight parts of titanium dioxide powder with a particle diameter of 0.8 micrometer was melted and kneaded in a separate extruder at 240° C. and then laminated by extrusion in film form through a die onto the surface of the previous lengthwise stretched film to obtain a surface layer/core layer (B/A) laminate.

A mixture of 80 weight parts of an ethylene-1-hexene copolymer (22 weight percent 1-hexene content, degree of crystallinity 30, number average molecular weight 23,000, melting point 90° C., MFR 18 g/10 min, density 0.898 g/cm$^3$) obtained by copolymerization of ethylene and 1-hexene using metallocene catalysts, and 20 weight parts of high-pressure low-density polyethylene (melting point 110° C., MFR 4 g/10 min, density 0.92 g/cm$^3$) were melted and kneaded at 200° C. in a twin-screw extruder, extruded as strands through a die, and cut to obtain heat-seal resin layer use pellets (II).

A resin composition (C), comprising 51.5 weight parts of propylene homopolymer (above-described MA-3), 3.5 weight parts of high-density polyethylene (above-described HJ580), 42 weight parts of calcium carbonate powder with a particle diameter of 1.5 micrometers, and 3 weight parts of titanium dioxide powder with a particle diameter of 0.8 micrometer, and above-described heat-seal resin layer use pellets (II) were melted and kneaded to 230° C. in separate extruders respectively, and fed into a single coextrusion die. After being laminated in the die, the laminate was extruded as a film at 230° C. through a die, and laminated [with above laminate (B/A) so that heat-seal resin layer (II) was to the outside of the layer A side of above-described surface layer/core layer laminate (B/A). In the course of lamination, an embossing roll on which several of the reverse trapezoidal patterns shown in Table 1 were carved per inch was employed to impart an embossment pattern on the heat-seal resin layer side.

The four-layer film (B/A/C/II) was directed into a Tenter oven, heated to 155° C., stretched by seven times in a crosswise direction, and annealed at 164° C. Subsequently, the film was cooled to 55° C., the edges were slit, and the surface layer (B) side was treated with a 70 W/m$^2$/min corona discharge.

Measurement of the density of this four-layered microporous resin stretched film revealed a density of 0.790 g/cm$^3$. The thickness was 80 micrometers (B/A/C/II=25/30/20/5 micrometers). The centerline average roughness (Ra) and smoothness of the heat-seal resin layer side of this four-layered microporous resin stretched film were measured; the results are given in Table 1.

The surface layer (B) side of the laminate stretched resin film was offset printed. Needles were then used to form holes of the diameter and pitch indicated in Table 1 from the printed side. The air permeability following hole formation was measured; the results are given in Table 1.

This product was then cut and punched to obtain labels for in-mold forming (W 60 mm×L 100 mm; W 95 mm×L 140 mm; W 90 mm×L 100 mm).

Examples 5 to 10 and Comparative Examples 7 to 12

Using the same method as above, a four-layered microporous resin stretched film was obtained. However, in the course of imparting the embossment pattern, an embossing roll was employed on which were carved the number of inverted trapezoidal patterns per inch shown in FIG. 2. The centerline average roughness (Ra) and smoothness of the heat-seal resin layer side of the microporous resin stretched film obtained were measured; the results are given in Table 2.

The surface layer (B) side of the laminate stretched resin film was offset printed, after which a Thomson blade was employed to form a slit pattern of the slit length and pitch, and slit length per cm$^2$ of the slit pattern shown in Table 2 from the printed side. The air permeability was measured and the external appearance of the slit portion was evaluated; the results are given in Table 2.

Next, the product was cut and punched, yielding labels for in-mold forming (W 60 mm×L 100 mm; W 95 mm×L 140 mm; W 90 mm×L 100 mm).

Test Examples

The following tests were conducted with the individual labels for in-mold forming that had been manufactured. In the tests, the label dimension, automatic label feeder pad shape, and container shape combinations indicated in (a), (b), and (c) below were employed.

Figure 8:
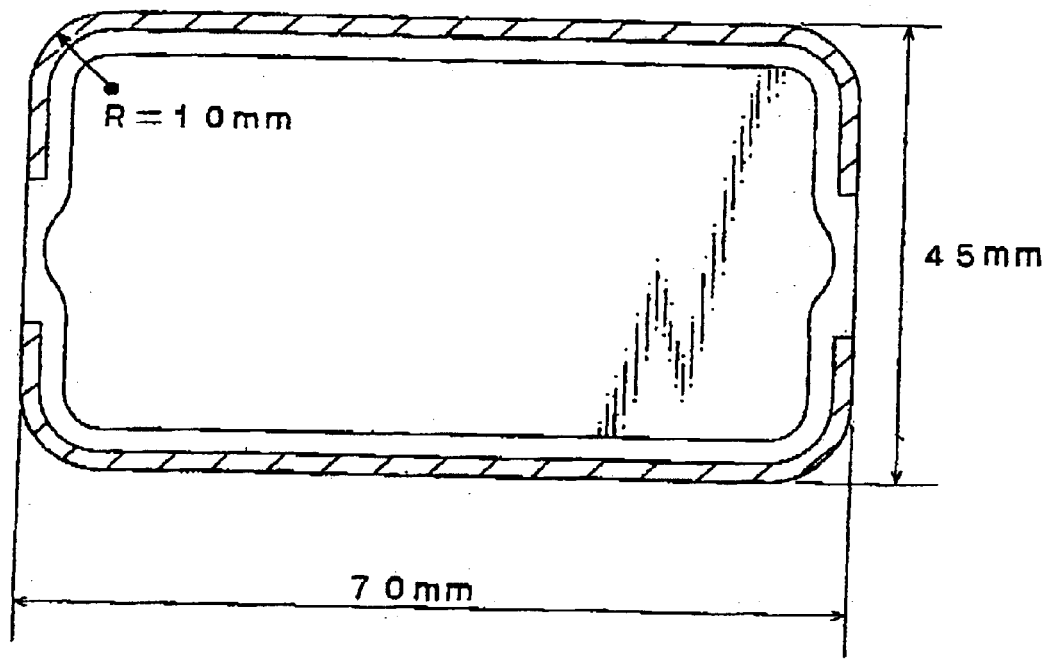
FIG. 8 is a sectional view of the container employed in example (c).

| | | |
|---|---|---|
| (a) | Label dimensions: | W 60 mm × L 100 mm |
| | Pad shape: | 10 mm diameter, four spots |
| | Container shape: | Cylindrical bottle, barrel portion 110 mm high × 44 mm diameter. |
| (b) | Label dimensions: | W 95 mm × L 140 mm |
| | Pad shape: | 30 mm diameter, two spots |
| | Container shape: | Cylindrical bottle, barrel portion 160 mm high × 62 mm diameter. |
| (c) | Label dimensions: | W 90 mm × L 100 mm |
| | Pad shape: | 10 mm diameter, four spots |
| | Container shape: | Flattened bottle, 70 mm in width, 45 mm in depth, 100 mm in barrel height Four corner R = 10 mm (see FIG. 8) |

One hundred of each of the labels for in-mold forming that had been manufactured were stacked, and using an automatic label feeder with the combinations of (a), (b), and (c) above, vacuum was used on one side of an air injection split mold to secure the printed side of the label to the mold, a parison of high-density polyethylene (melting point 134° C.) was melt extruded at 200° C., the split mold was closed, 4.2 kg/cm² of pressurized air was injected into the parison to expand the parison and cause it to adhere tightly to the mold, forming a container while fusing the parison to the label for in-mold forming. The mold was cooled and then opened, at which time labeled hollow containers (a), (b), and (c) were retrieved.

The results of a determination as to the presence or absence of blistering in each of the samples are given in Tables 1 and 2.

Labels punched to the above-stated dimensions were loaded into label magazines and continuously fed hundred sheets of the labels into hollow-molding split molds with automatic label feeders (made by Penteru (Ltd.) and Tahara (Ltd.)). The number of errors during molding (picking up two labels, label falling off mold, label not adhering to prescribed position) was tallied. Based on the number of errors, the feeding of labels into the mold was evaluated on the following scale; the results are given in Tables 1 and 2. The labels of Comparative Example 10 had extremely poor rigidity in the crosswise direction and the labels were observed to crease.

O: No errors at all.

Δ: Errors occurred with 1–5 labels

X: Errors occurred with 6 or more labels.

The labels adhered to containers that were formed with above-described combination (b) were cut to a width of 15 mm and the adhesive strength of the label to the container was calculated with a tension tester (Autograph Model AGS-D made by Shimazu Seisakusho) at an elastic stress rate of 300 mm/min with T separation. The results are given in Tables 1 and 2. The scale used to evaluate actual use of the labels was as follows:

400 (g/15 mm) or better: No problem in actual use.

200 to 400 (g/15 mm): Somewhat weak adhesion, but no problem in actual use.

Less than 200 (g/15 mm): Problematic in actual use.

TABLE 1

| | | Emb. 1 | Emb. 2 | Emb. 3 | Emb. 4 | Com. Ex. 1 | Com. Ex. 2 | Com. Ex. 3 | Com. Ex. 4 | Com. Ex. 5 | Com. Ex. 6 |
|---|---|---|---|---|---|---|---|---|---|---|---|
| Processing | Diameter of through-holes (mm) | 0.3 | 0.3 | 0.2 | 0.4 | Absent | 0.1 | 0.3 | 0.3 | 0.3 | 0.3 |
| | Pitch (mm) | 14 | 10 | 20 | 10 | — | 20 | 5 | 5 | 14 | 14 |
| | Embossing roll (lines/inch) | 150 | 150 | 100 | 200 | 150 | 150 | 150 | — | — | 60 |
| Physical properties | Air permeability (sec) | 800 | 200 | 10,000 | 70 | infinity | 50,000 | 5 | 5 | 800 | 800 |
| | Centerline average roughness Ra (micrometers) | 2.5 | 2.5 | 3.7 | 1.2 | 2.5 | 2.5 | 2.5 | 0.2 | 0.2 | 8 |
| | Smoothness (sec) | 180 | 180 | 100 | 300 | 180 | 180 | 180 | 2000 | 2000 | 15 |
| | Permeability/roughness Ra (sec/micrometers) | 320 | 80 | 2703 | 58 | infinity | 20,000 | 2 | 25 | 4000 | 100 |
| Evaluation | Blistering Shape (a) | Absent | Absent | Absent | Absent | Present | Present | Absent | Absent | Absent | Absent |
| | Shape (b) | Absent | Absent | Absent | Absent | Present | Present | Absent | Present | Present | Absent |
| | Shape (c) | Absent | Absent | Absent | Absent | Present | Present | Absent | Absent | Absent | Absent |
| | Label feed Shape (a) | o | o | o | o | o | o | o | o | o | Δ |
| | properties Shape (b) | o | o | o | o | o | o | x | x | o | Δ |
| | Shape (c) | o | o | o | o | o | o | o | o | o | Δ |
| | Adhesion strength (g/15 mm) | 500 | 510 | 480 | 490 | 420 | 480 | 520 | 430 | 420 | 530 |

TABLE 2

| | | Emb. 5 | Emb. 6 | Emb. 7 | Emb. 8 | Emb. 9 | Emb. 10 | Com. Ex. 7 | Com. Ex. 8 | Com. Ex. 9 | Com. Ex. 10 | Com. Ex. 11 | Com. Ex. 12 |
|---|---|---|---|---|---|---|---|---|---|---|---|---|---|
| Processing | Slit pattern | D | A | B | D | D | C | D | A | A | B | D | D |
| | Slit length (mm) | 5 | 10 | 1 | 1 | 7 | 1 | 0.3 | 25 | 8 | 2.5 | 5 | 5 |
| | Pitch (mm) | 14 | 20 | 10 | 14 | 14 | 10 | 14 | 30 | 10 | 3 | 14 | 14 |
| | Slit length per cm² (mm/cm²) | 2.5 | 2.5 | 1 | 0.5 | 3.5 | 2 | 0.15 | 2.75 | 8 | 27.8 | 2.5 | 2.5 |
| | Embossed roll (lines/inch) | 150 | 150 | 150 | 100 | 200 | 200 | 150 | 150 | 150 | — | — | 60 |
| Physical Properties | Air Permeability (sec) | 60 | 55 | 255 | 580 | 50 | 40 | 25,000 | 8 | 5 | 2 | 70 | 50 |
| | Centerline average roughness Ra (micrometers) | 2.5 | 2.5 | 2.5 | 3.7 | 1.2 | 1.2 | 2.5 | 2.5 | 2.5 | 0.2 | 0.2 | 8 |
| | Smoothness (sec) | 180 | 180 | 180 | 100 | 300 | 300 | 180 | 180 | 180 | 2000 | 2000 | 15 |
| | Permeability/roughness Ra (sec/micrometers) | 24 | 22 | 102 | 157 | 42 | 33 | 10,000 | 3 | 2 | 10 | 350 | 6 |
| Evaluation | Appearance of slit portion | Good | Good | Good | Good | Good | Good | Good | Poor | Good | Good | Good | Good |
| | Blistering Shape (a) | Absent | Absent | Absent | Absent | Absent | Absent | Present | Present | Absent | Absent | Absent | Absent |
| | Shape (b) | Absent | Absent | Absent | Absent | Absent | Absent | Present | Present | Absent | Absent | Present | Absent |
| | Shape (c) | Absent | Absent | Absent | Absent | Absent | Absent | Present | Present | Absent | Absent | Absent | Absent |

TABLE 2-continued

|  |  | Emb. 5 | Emb. 6 | Emb. 7 | Emb. 8 | Emb. 9 | Emb. 10 | Com. Ex. 7 | Com. Ex. 8 | Com. Ex. 9 | Com. Ex. 10 | Com. Ex. 11 | Com. Ex. 12 |
|---|---|---|---|---|---|---|---|---|---|---|---|---|---|
| Label feed properties | Shape (a) | ○ | ○ | ○ | ○ | ○ | ○ | ○ | ○ | ○ | ○ | ○ | Δ |
|  | Shape (b) | ○ | ○ | ○ | ○ | ○ | ○ | ○ | x | x | x | ○ | Δ |
|  | Shape (c) | ○ | ○ | ○ | ○ | ○ | ○ | ○ | ○ | ○ | ○ | ○ | Δ |
| Adhesive strength (g/15 mm) |  | 510 | 520 | 480 | 500 | 510 | 500 | 470 | 490 | 530 | 520 | 450 | 540 |

Note:
Slit patterns:
A: Grid-like vertical slits;
B: Grid-like diagonal slits;
C: Grid-like cross slits;
D: Diagonal grid-like slits.

Potential for Industrial Use

In-mold forming with the label of the present invention permits the manufacturing of labeled molded resin articles while effectively preventing blistering in molded resin articles of a variety of shapes. Although blistering cannot be prevented with conventional labels for highly curved surfaces where the label adhesion portion has a large radius of curvature, the use of the label of the present invention is particularly effective in preventing blistering in such cases. Further, the use of the label for in-mold forming of the present invention permits the reliable and smooth securing by suction of the label in automatic label feeders, and the efficiency of manufacturing by in-mold forming is high. Thus, the use of the label of the present invention permits the inexpensive manufacturing of labeled molded resin articles of high commercial value.

The disclosure of the priority documents, Japanese Application Nos. 2000-181257 and 2000-226451, filed on Jun. 16, 2000 and Jul. 27, 2000, respectively, are incorporated by reference herein in their entireties.

What is claimed is:

1. A label for in-mold forming comprising a thermoplastic resin film base layer and a heat-seal resin layer, wherein a surface of the heat-seal resin layer is embossed and has a centerline average roughness of 0.5 to 5 micrometers and the label has an air permeability of 10 to 20,000 seconds.

2. The label for in-mold forming according to claim 1, wherein the surface of the heat-seal resin layer has a centerline average roughness of 1 to 4 micrometers.

3. The label for in-mold forming according to claim 1, wherein the label has an air permeability of 30 to 15,000 seconds.

4. The label for in-mold forming according to claim 1, wherein the value obtained by dividing the air permeability by the centerline average roughness is from 10 to 4,000 seconds/micrometer.

5. The label for in-mold forming according to claim 1, wherein the value obtained by dividing the air permeability by the centerline average roughness is from 20 to 3,000 seconds/micrometer.

6. The label for in-mold forming according to claim 1, which has holes.

7. The label for in-mold forming according to claim 6, which has holes in a grid-like form.

8. The label for in-mold forming according to claim 7, wherein the hole diameter is from 0.05 to 1 mm and the pitch of adjacent holes is from 5 to 30 nm.

9. The label for in-mold forming according to claim 7, wherein the hole diameter is from 0.1 to 0.5 mm and the pitch of adjacent holes is from 10 to 20 mm.

10. The label for in-mold forming according to claim 1, which has slits.

11. The label for in-mold forming according to claim 10, which has slits in a grid-like form.

12. The label for in-mold forming according to claim 11, wherein the length of the slits is from 0.5 to 20 mm and the pitch thereof is from 5 to 25 mm.

13. The label for in-mold forming according to claim 11, wherein the length of the slits is from 1 to 15 mm and the pitch thereof is from 10 to 20 mm.

14. The label for in-mold forming according to claim 11, wherein the length of the slits is less than or equal to ⅔ the pitch of the slits.

15. The label for in-mold forming according to claim 11, wherein the length of the slits is less than or equal to ½ the pitch of the slits.

16. The label for in-mold forming according to claim 1, wherein the thermoplastic resin film base layer comprises a film that has been stretched in at least one direction.

17. The label for in-mold forming according to claim 1, wherein the thermoplastic resin film base layer is comprised of a microporous resin stretched film comprising organic and/or inorganic finepowder.

18. The label for in-mold forming according to claim 1, wherein the heat-seal resin layer is comprised of an ethylene based resin.

19. The label for in-mold forming according to claim 18, wherein the heat-seal resin layer is comprised of polyethylene having a degree of crystallinity of from 10 to 60 percent, a number average molecular weight of from 10,000 to 40,000, and a melting point of from 50 to 130° C.

20. The label for in-mold forming according to claim 1, wherein the heat-seal resin layer is formed on the thermoplastic resin film base layer by a melt-laminating method or a coating method.

21. A labeled molded resin article in which a label, is integrally adhered to a molded resin article by thermal fusion, wherein the label comprises a thermoplastic resin film base layer and a heat-seal resin layer, a surface of the heat-seal resin layer is embossed and has a centerline average roughness of 0.5 to 5 micrometers and the label has an air permeability of 10 to 20,000 seconds.

22. The labeled molded resin article according to claim 21, wherein the portion of the molded resin article where the label for in-mold forming has been thermally fused comprises a curved surface.

23. The labeled molded resin article according to claim 21, wherein the portion of the molded resin article where the label for in-mold forming has been thermally fused comprises a curved surface with a radius of curvature of 200 mm or less.

24. The labeled molded resin article according to claim 21, wherein the label for in-mold forming is integrally adhered to the molded resin article by vaccum molding or differential pressure molding.

* * * * *